(12) United States Patent  (10) Patent No.: US 8,997,542 B2
Nakashima et al.  (45) Date of Patent: Apr. 7, 2015

(54) MANUFACTURING METHOD AND MANUFACTURING APPARATUS FOR CUP-SHAPED MEMBER

(75) Inventors: Isao Nakashima, Nishio (JP); Masaki Nakajima, Toyohashi (JP); Atsushi Maeda, Nishio (JP)

(73) Assignee: Aisin AW Co., Ltd., Aichi-ken (JP)

(*) Notice: Subject to any disclaimer, the term of this patent is extended or adjusted under 35 U.S.C. 154(b) by 241 days.

(21) Appl. No.: 13/611,747

(22) Filed: Sep. 12, 2012

(65) Prior Publication Data

US 2013/0081439 A1 Apr. 4, 2013

(30) Foreign Application Priority Data

Sep. 30, 2011 (JP) ................................ 2011-215891

(51) Int. Cl.
  *B21D 17/04* (2006.01)
  *B21D 53/28* (2006.01)
  *B21D 53/34* (2006.01)
  *B21D 17/02* (2006.01)

(52) U.S. Cl.
  CPC ............... *B21D 17/02* (2013.01); *B21D 17/04* (2013.01); *B21D 53/28* (2013.01); *B21D 53/34* (2013.01)

(58) Field of Classification Search
  CPC ........ B21D 17/02; B21D 17/04; B21D 22/28; B21D 53/28; B21D 53/34

USPC ............. 72/75, 206, 212, 213, 347, 348, 349, 72/370.21
See application file for complete search history.

(56) References Cited

U.S. PATENT DOCUMENTS

| | | | |
|---|---|---|---|
| 3,796,106 A | 3/1974 | Fisher et al. | |
| 4,397,171 A * | 8/1983 | Suh et al. | 72/348 |
| 7,743,637 B2 * | 6/2010 | Schlayer et al. | 72/348 |
| 2009/0049880 A1 | 2/2009 | Schlayer et al. | |
| 2009/0126440 A1 * | 5/2009 | Ziesel et al. | 72/213 |

FOREIGN PATENT DOCUMENTS

| | | |
|---|---|---|
| JP | 57-170843 U | 10/1982 |
| JP | 07-185674 A | 7/1995 |
| JP | 2003-191025 A | 7/2003 |

OTHER PUBLICATIONS

International Search Report for corresponding International Patent Application No. PCT/JP2012/071067 dated Nov. 13, 2012.

* cited by examiner

*Primary Examiner* — Teresa M Ekiert
(74) *Attorney, Agent, or Firm* — Sughrue Mion, PLLC

(57) ABSTRACT

A manufacturing method for a cup-shaped member including a corrugated portion includes a drawing step, a preliminary processing step, and a finishing step. In the preliminary processing step, at least preliminary large diameter portions in a preliminary corrugated portion are each formed to have a width larger than the size of each of the large diameter portions of the corrugated portion, thereby reducing an ironing resistance in the manufacturing of the cup-shaped member.

4 Claims, 15 Drawing Sheets

F I G . 7
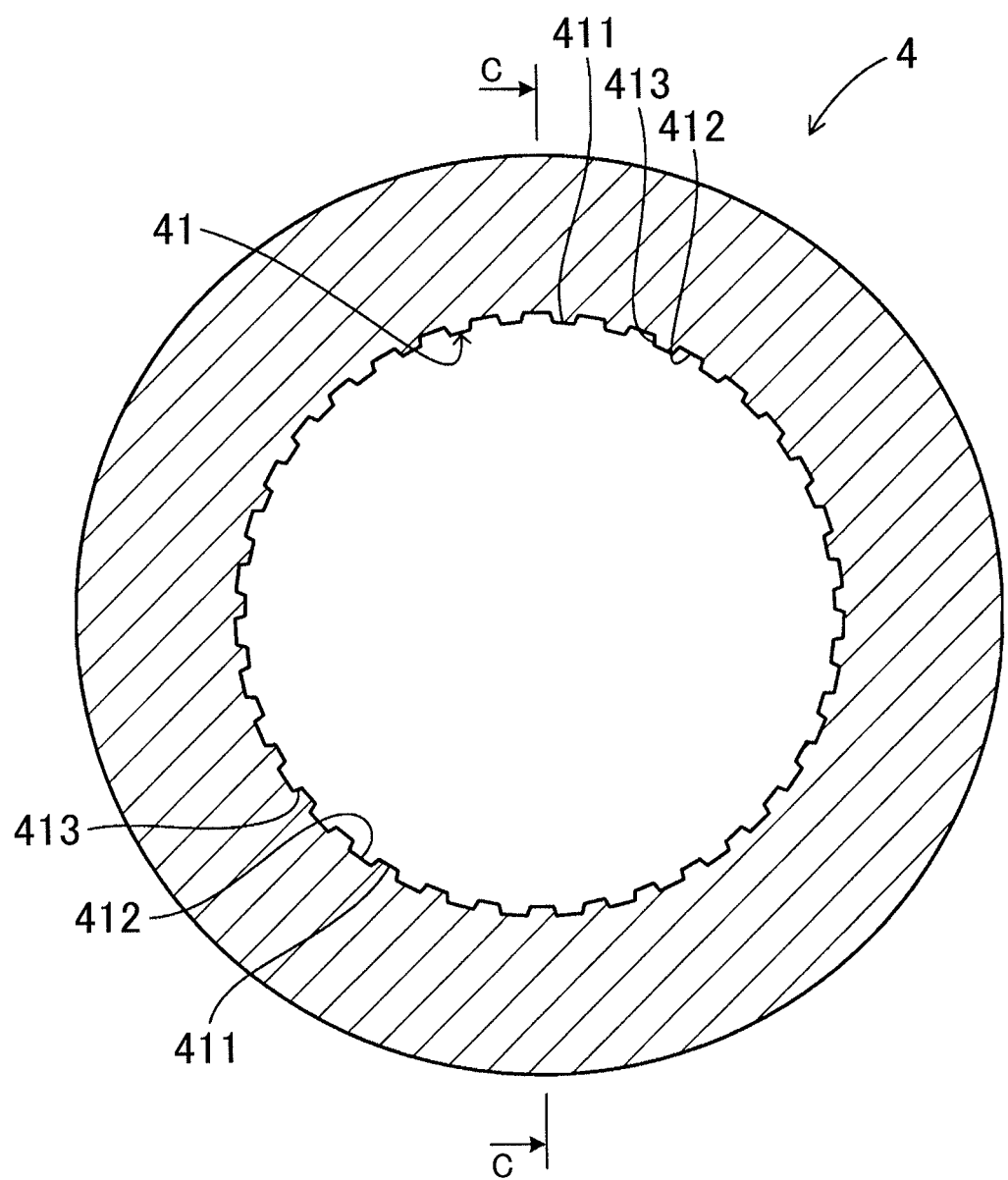

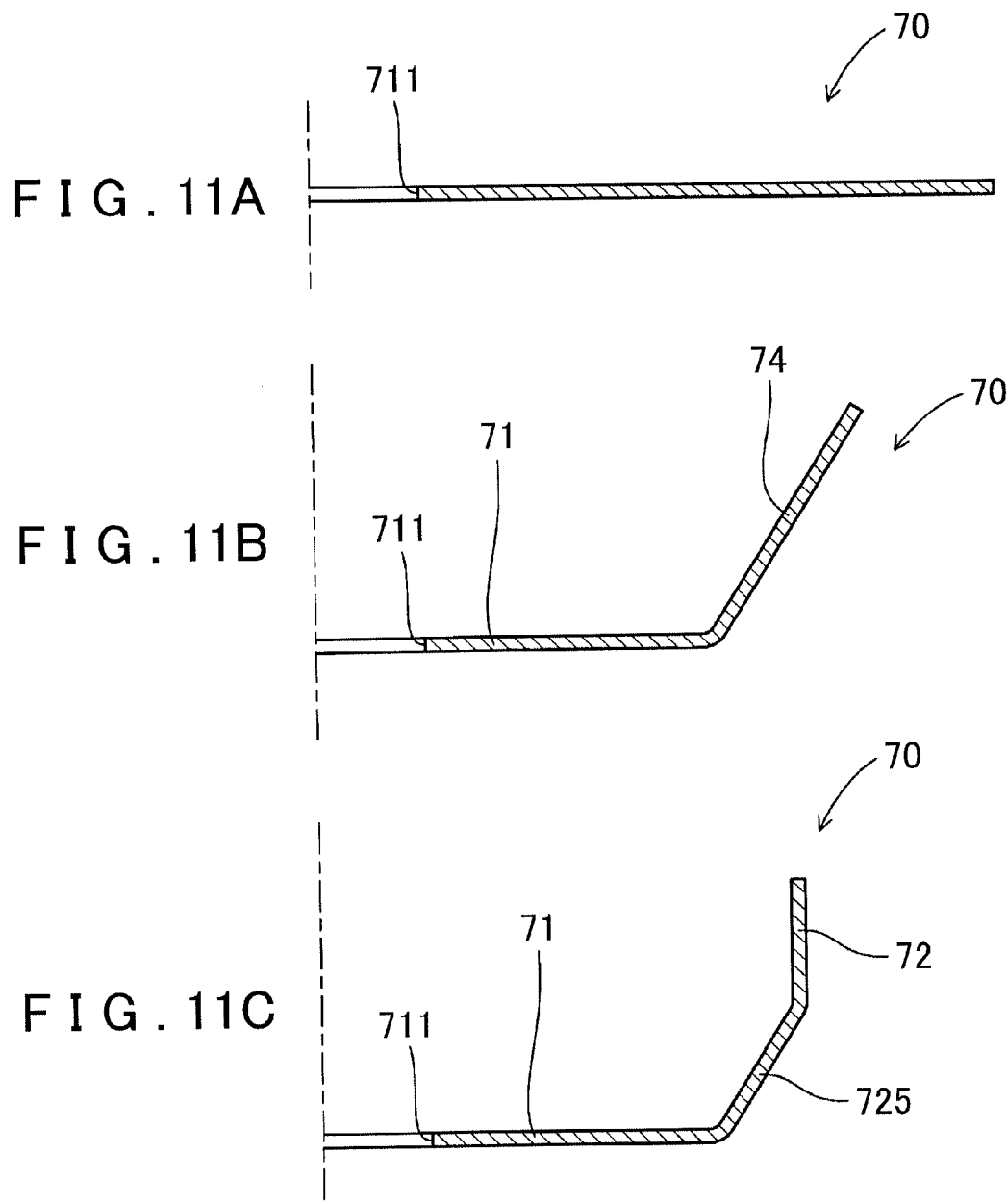

MANUFACTURING METHOD AND MANUFACTURING APPARATUS FOR CUP-SHAPED MEMBER

INCORPORATION BY REFERENCE

The disclosure of Japanese Patent Application No. 2011-215891 filed on Sep. 30, 2011 including the specification, drawings and abstract is incorporated herein by reference in its entirety.

BACKGROUND OF THE INVENTION

The present invention relates to a manufacturing method and a manufacturing apparatus for a cup-shaped member including a corrugated portion.

DESCRIPTION OF THE RELATED ART

A cup-shaped member has been used for a clutch hub and a clutch drum of an automatic transmission in a vehicle and the like. The cup-shaped member includes a disk-shaped bottom portion, a cylinder portion standing from the outer periphery of the bottom portion, and a corrugated portion provided on the cylinder portion. The corrugated portion includes small diameter portions formed by denting the cylinder portion radially inward, large diameter portions protruding radially outward of the small diameter portions, and tooth surface portions connecting the small diameter portions with the large diameter portions.

The cup-shaped member including this corrugated portion can be manufactured by ironing using a die or a forming roller and a punch. The ironing using a die is simpler in mechanism than that using a forming roller, and thus can be achieved at a lower facility cost. However, the amount of relative slip between the die and a material and ironing resistance are large. Accordingly, the die is likely to be damaged by wearing, cracking, or the like, and thus the service life thereof tends to be short. Thus, the material is subjected to a lubricating process such as a bonderizing process beforehand to reduce a friction coefficient between the die and the material in an aim to reduce the ironing resistance in the ironing. However, performing the lubricating process such as a bonderizing process beforehand increases the unit cost of the material, which in turn leads to an increase in the cost of the cup-shaped member.

In contrast, the amount of relative slip between the forming roller and the material can be lowered in the ironing using a forming roller by rotatably providing the forming roller. Accordingly, an attempt to achieve low ironing resistance for long tool life can be facilitated without lubricating the material beforehand. All things considered, the ironing using the forming roller is preferably employed in terms of the cost of the material and the tool life.

A generally known configuration of a manufacturing apparatus for a cup-shaped member, using the forming roller includes ironing performed by inserting the material and the punch in a forming roller portion in which a plurality of forming rollers are radially arranged. Japanese Patent Application Publication No. 7-185674 (JP 7-185674 A) describes a manufacturing apparatus for a cup-shaped member including a single-stage forming roller portion. Japanese Patent Application Publication No. 2003-191025 (JP 2003-191025 A) describes a manufacturing apparatus for a cup-shaped member, in which three forming roller portions are stacked.

SUMMARY OF THE INVENTION

The manufacturing apparatuses for a cup-shaped member described in JP 7-185674 A and JP 2003-191025 A have the following problems.

In the manufacturing apparatus for a cup-shaped member in JP 7-185674 A, a cup-shaped member is formed by single ironing, and thus hard ironing with a large ironing degree is carried out. Accordingly, even though the forming roller is used, the ironing resistance is large, and stresses applied to the inner and outer peripheral sides of the cylinder portion of the cup-shaped member are not uniform. Therefore, problems like defective forming such as warping of the cylinder portion and the inaccuracy of the corrugated portion are likely to occur.

In the manufacturing apparatus for a cup-shaped member in JP 2003-191025 A, the ironing gradually proceeds with the three-stage forming roller portions. Thus, an attempt to achieve a low ironing degree and uniformize the stresses on the inner peripheral side and the outer peripheral side of the cylinder portion can be facilitated. However, disposing a plurality of forming roller portions in a stacked manner leads to a larger and more complex apparatus, resulting in a high facility cost.

The present invention is made in view of the above circumstances, and aims to provide a manufacturing apparatus and a manufacturing method for a cup-shaped member including a corrugated portion, both of which can achieve reduction in the size of facilities and manufacture cup-shaped members with high accuracy and low cost.

An aspect of the present invention provides a manufacturing method for a cup-shaped member having a corrugated portion, which includes a disk-shaped bottom portion and a cylinder portion standing upright with respect to the bottom portion, and in which the corrugated portion having small diameter portions formed by denting the cylinder portion radially inward, large diameter portions protruding radially outward of the small diameter portions, and tooth surface portions connecting the small diameter portions with the large diameter portions is formed. The manufacturing method includes: a drawing step of forming a disk-shaped material into a cup shape; a preliminary processing step of performing ironing with a generally column-shaped punch including an inner tooth forming portion corresponding to an inner peripheral shape of the corrugated portion on an outer peripheral surface and a preliminary tooth forming die having a preliminary tooth forming hole to form a preliminary corrugated portion including preliminary small diameter portions, preliminary large diameter portions, and preliminary tooth surface portions; and a finishing step of performing ironing with the punch and a forming roller portion in which a final tooth forming hole corresponding to an outer peripheral shape of the corrugated portion is formed by contiguously arranging outer peripheral surfaces of a plurality of radially arranged forming rollers to form the preliminary corrugated portion into the corrugated portion. In the preliminary processing step, the preliminary large diameter portions in the preliminary corrugated portion are each formed to have at least a width larger than each of the large diameter portions of the corrugated portion.

Another aspect of the present invention provides a manufacturing apparatus for a cup-shaped member having a corrugated portion, which includes a disk-shaped bottom portion and a cylinder portion standing upright with respect to the bottom portion, and in which a corrugated portion having small diameter portions formed by denting the cylinder portion radially inward, large diameter portions protruding radially outward of the small diameter portions, and tooth surface portions connecting the small diameter portions with the large diameter portions is formed. The manufacturing apparatus includes: a generally column-shaped punch including an inner tooth forming portion corresponding to an inner peripheral shape of the corrugated portion on an outer peripheral surface; a drawing die having a drawing hole for forming a disk-shaped material into a cup shape; a preliminary tooth forming die having a preliminary tooth forming hole corresponding to an outer peripheral shape of a preliminary corrugated portion including preliminary small diameter portions, preliminary large diameter portions, and preliminary tooth surface portions; and a forming roller portion in which a final tooth forming hole corresponding to an outer peripheral shape of the corrugated portion is formed by contiguously arranging outer peripheral surfaces of a plurality of radially arranged forming rollers. The punch is structured to sequentially pass through the drawing hole of the drawing die, the preliminary tooth forming hole of the preliminary tooth forming die, and the final tooth forming hole of the forming roller portion. In the preliminary tooth forming hole of the preliminary tooth forming die, a width of each of preliminary forming recesses for processing the preliminary large diameter portions is larger than a width of each of the large diameter portions.

The manufacturing method for the cup-shaped member including the corrugated portion includes the drawing step, the preliminary processing step, and the finishing step, and in the preliminary processing step, at least the preliminary large diameter portions in the preliminary corrugated portion are each formed to have a width larger than the size of each of the large diameter portions of the corrugated portion. Thus, the ironing resistance in the manufacturing of the cup-shaped member can be reduced.

Specifically, in the preliminary processing step, the preliminary corrugated portion is formed with a small amount of forming as an intermediate state of the corrugated portion to be provided on the cylinder portion. Here, with the preliminary large diameter portions being wider than the large diameter portions as described above, large spaces for forming the preliminary tooth surface portions of the preliminary corrugated portion are provided between the punch and the preliminary tooth forming die. The spaces for forming the preliminary tooth surface portions are each adjacent to the preliminary small diameter portion and preliminary large diameter portion and are each formed between the preliminary small diameter portion and preliminary large diameter portion that are adjacent to each other. With the spaces for receiving pads produced during ironing formed at positions adjacent to the preliminary small diameter portions and the preliminary large diameter portions, the pads can readily move, and thus the ironing resistance can be reduced.

In the finishing step, the plurality of forming rollers in the forming roller portion perform ironing while rotating. The ironing using the forming roller involves a small amount of relative slip between the material and the forming roller, and thus has an advantage that the ironing resistance in the finishing step is small. With the preliminary corrugated portion formed beforehand in the preliminary processing step, the amount of forming can be also reduced in the finishing step. Thus, the ironing resistance in the finishing step can be reduced.

The thickness of each of the preliminary tooth surface portions formed in the preliminary processing step is larger than the thickness of each of the tooth surface portions due to the pads flowing therein. Thus, in the finishing step, the ironing to expand the preliminary tooth surface portions with the forming roller can be performed. Accordingly, the pads can be distributed throughout the large diameter potions and the small diameter portions and can be surely filled. Thus, the large diameter portions, the small diameter portions, and the tooth surface portions can be more accurately and surely formed.

The preliminary processing step is carried out with the preliminary tooth forming die, and then the finishing step is carried out with the forming roller portion. Accordingly, the material to be subjected to the preliminary processing step is not yet subjected to the ironing and thus is less subject to work hardening, and is relatively easy to process. The material that is work-hardened due to the preliminary processing is subjected to the finishing step using the forming roller portion of which the amount of relative slip with respect to the material is small. Thus, the ironing resistance to be applied to the preliminary tooth forming die and the forming roller portion can be efficiently distributed, and an attempt to achieve a long tool life can be facilitated.

By thus reducing the ironing resistance in the preliminary processing step and the finishing step and distributing the ironing resistance in the steps, a cup-shaped member can be accurately manufactured without lubricating the material beforehand.

The manufacturing apparatus for the cup-shaped member includes the punch, the drawing die, the preliminary tooth forming die, and the forming roller portion. Thus, with the manufacturing apparatus for the cup-shaped member, an excellent manufacturing method can be surely achieved as described above, and the cup-shaped member can be readily manufactured.

The preliminary tooth forming die having a simple structure and the forming roller portion with a small amount of relative slip with respect to the material are used in combination. Thus, the size of the manufacturing apparatus for the cup-shaped member can be reduced with the formability and the forming accuracy for the cup-shaped member secured.

The punch is structured to sequentially pass through the drawing hole of the drawing die, the preliminary tooth forming hole of the preliminary tooth forming die, and the final tooth forming hole of the forming roller portion. Accordingly, the drawing die, the preliminary tooth forming die, and the forming roller portion are rectilinearly arranged and thus, the processing with the drawing die, the preliminary tooth forming die, and the forming roller portion can be performed in a single stroke of the punch. This enhances the productivity of cup-shaped members.

As described above, the manufacturing method and the manufacturing apparatus for a cup-shaped member can achieve reduction in the size of facilities and manufacture cup-shaped members with high accuracy and low cost.

BRIEF DESCRIPTION OF THE DRAWINGS

FIG. 7 is a cross-sectional view taken along lines indicated by arrows B-B in FIG. 1;

FIG. 11A is a partial sectional view of the material before being formed, FIG. 11B is a partial sectional view of the material being sandwiched by an upper punch and a lower punch, and FIG. 11C is a partial sectional view of the cup-shaped member after the drawing step in the first embodiment;

DETAILED DESCRIPTION OF THE EMBODIMENTS

In the manufacturing method and the manufacturing apparatus for the cup-shaped member, in the preliminary tooth forming hole of the preliminary tooth forming die, the preliminary forming protrusions that form the preliminary small diameter portions may be positioned radially outward of the small diameter portions. Here, in the preliminary processing step, the ironing on the preliminary small diameter portions can be generally omitted or the amount of ironing for the preliminary small diameter portions can be reduced, and the entire ironing or a further required amount of ironing for the small diameter portions can be performed in the finishing step. Thus, an attempt to further reduce the ironing resistance in the preliminary processing step, or optimize the resistance balance between the preliminary processing step and the finishing step can be facilitated.

Embodiment

First Embodiment

An embodiment of each of a manufacturing method and manufacturing apparatus 1 for a cup-shaped member 7 including a corrugated portion 721 will be described with reference to FIG. 1 to FIG. 15.

Figure 15:
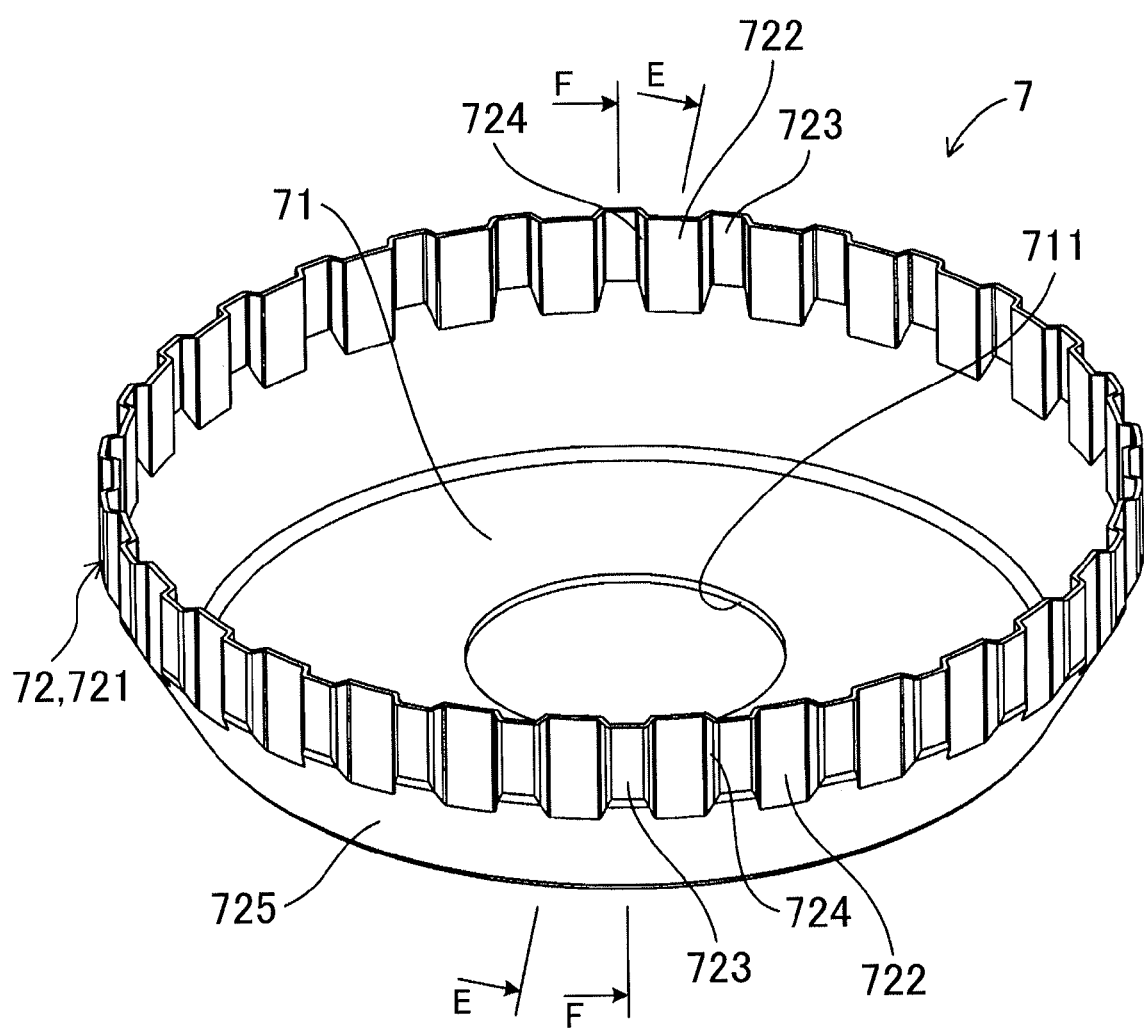
FIG. 15 is an explanatory diagram of the cup-shaped member including a corrugated portion in the first embodiment.

As illustrated in FIG. 15, the cup-shaped member 7 including the corrugated portion 721 has a disk-shaped bottom portion 71 and a cylinder portion 72 standing upright with respect to the bottom portion 71. The cylinder portion 72 is provided with the corrugated portion 721 including small diameter portions 722 formed by denting the cylinder portion 72 toward the inner side in a radial direction, large diameter portions 723 protruding radially outward of the small diameter portions 722, and tooth surface portions 724 connecting the small diameter portions 722 with the large diameter portions 723.

As illustrated in FIG. 1 to FIG. 5, the manufacturing apparatus 1 for the cup-shaped member 7 includes: a generally column-shaped upper punch 10 having an inner tooth forming portion 12 corresponding to the inner peripheral shape of the corrugated portion 721 on an outer peripheral surface 11; and a drawing die 3 including a drawing hole 31 for forming a disk-shaped material 70 into a cup shape. As shown in FIG. 7 to FIG. 10, the manufacturing apparatus 1 for the cup-shaped member 7 includes a preliminary tooth forming die 4 and a forming roller portion 5. The preliminary tooth forming die 4 includes a preliminary tooth forming hole 41 corresponding to the outer peripheral shape of a preliminary corrugated portion 73 having preliminary large diameter portions 731, preliminary small diameter portions 732, and preliminary tooth surface portions 733. In the forming roller portion 5, a final tooth forming hole 51 corresponding to the outer peripheral shape of the corrugated portion 721 is formed by contiguously arranging outer peripheral surfaces 521 of a plurality of radially arranged forming rollers 52.

Figure 13:
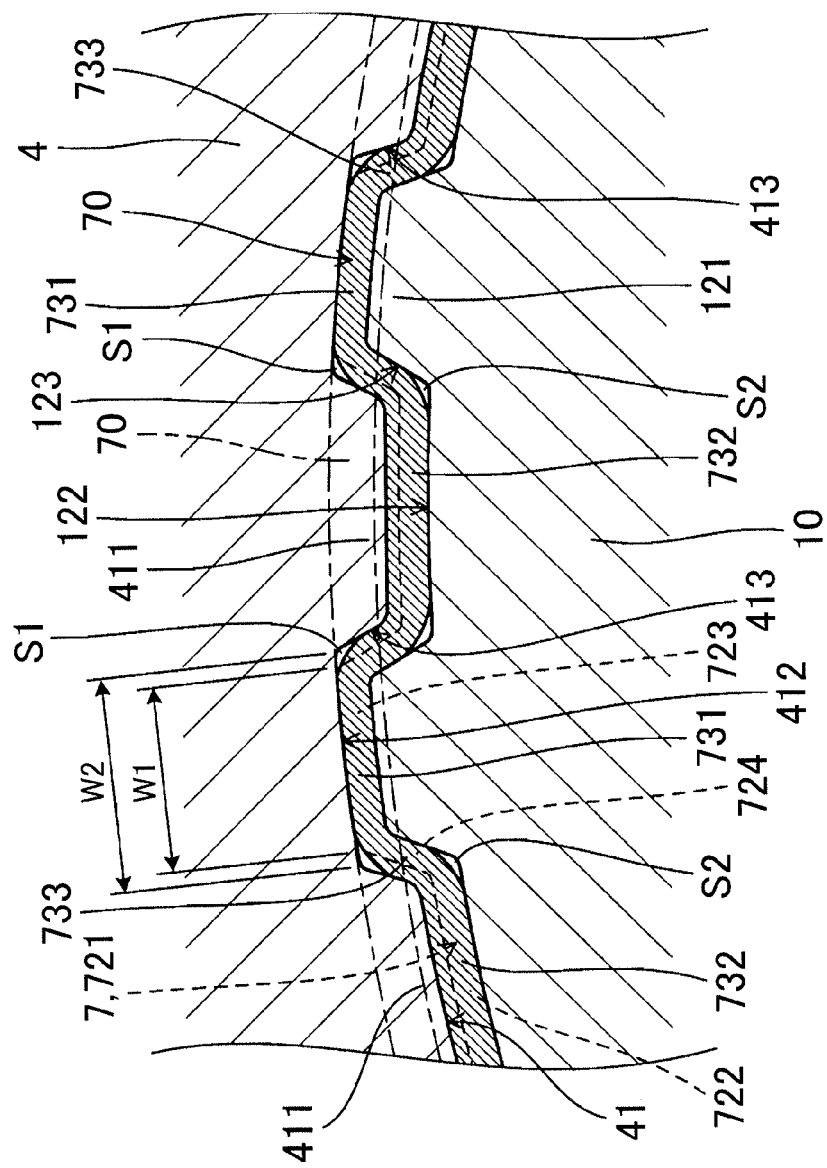
FIG. 13 is a partial cross-sectional view of the cup-shaped member after the preliminary processing step (a cross-sectional view taken along lines indicated by arrows G-G in FIG. 12A) in the first embodiment.

In the manufacturing apparatus 1 for the cup-shaped member 7, the upper punch 10 is structured to sequentially pass through the drawing hole 31 of the drawing die 3, the preliminary tooth forming hole 41 of the preliminary tooth forming die 4, and the final tooth forming hole 51 of the forming roller portion 5. As illustrated in FIG. 13, in the preliminary tooth forming hole 41 of the preliminary tooth forming die 4, a width W2 of each of preliminary forming recesses 412 for preliminary processing of the large diameter portions 723 is larger than a width W1 of each of the large diameter portions 723.

The cup-shaped member 7 having the corrugated portion 721 of this embodiment is described more in detail.

In this embodiment, a direction along the axis of the cup-shaped member 7 is defined as an axial direction, while a direction orthogonal to the axial direction is defined as a radial direction.

The distal end side of the upper punch 10 of the manufacturing apparatus 1 to be described later is defined as a lower side, while the side opposite thereto is defined as an upper side.

The cup-shaped member 7 of this embodiment is used for a clutch hub or a clutch drum in an automatic transmission of a vehicle.

As illustrated in FIG. 15, the cup-shaped member 7 includes the disk-shaped bottom portion 71 and the cylinder portion 72 standing upright with respect to the outer periphery of the bottom portion 71.

The bottom portion 71 has an annular shape with a through hole 711 formed at the center thereof.

The cylinder portion 72 has a larger diameter than the bottom portion 71. The bottom portion 71 and the cylinder portion 72 are connected by a cup tapered portion 725 of which the diameter reduces from the diameter of the cylinder portion 72 to the diameter of the bottom portion 71.

The cylinder portion 72 has the corrugated portion 721 formed along the axial direction in the entire length of the cylinder portion 72 in the axial direction. The corrugated portion 721 includes the small diameter portions 722 formed by denting the cylinder portion 72 radially inward, the large diameter portions 723 protruding radially outward of the small diameter portions 722, and the tooth surface portions 721 connecting the small diameter portions 722 with the large diameter portions 723.

Next, the manufacturing apparatus 1 for the cup-shaped member 7 for manufacturing the cup-shaped member 7 is described.

Figure 1:
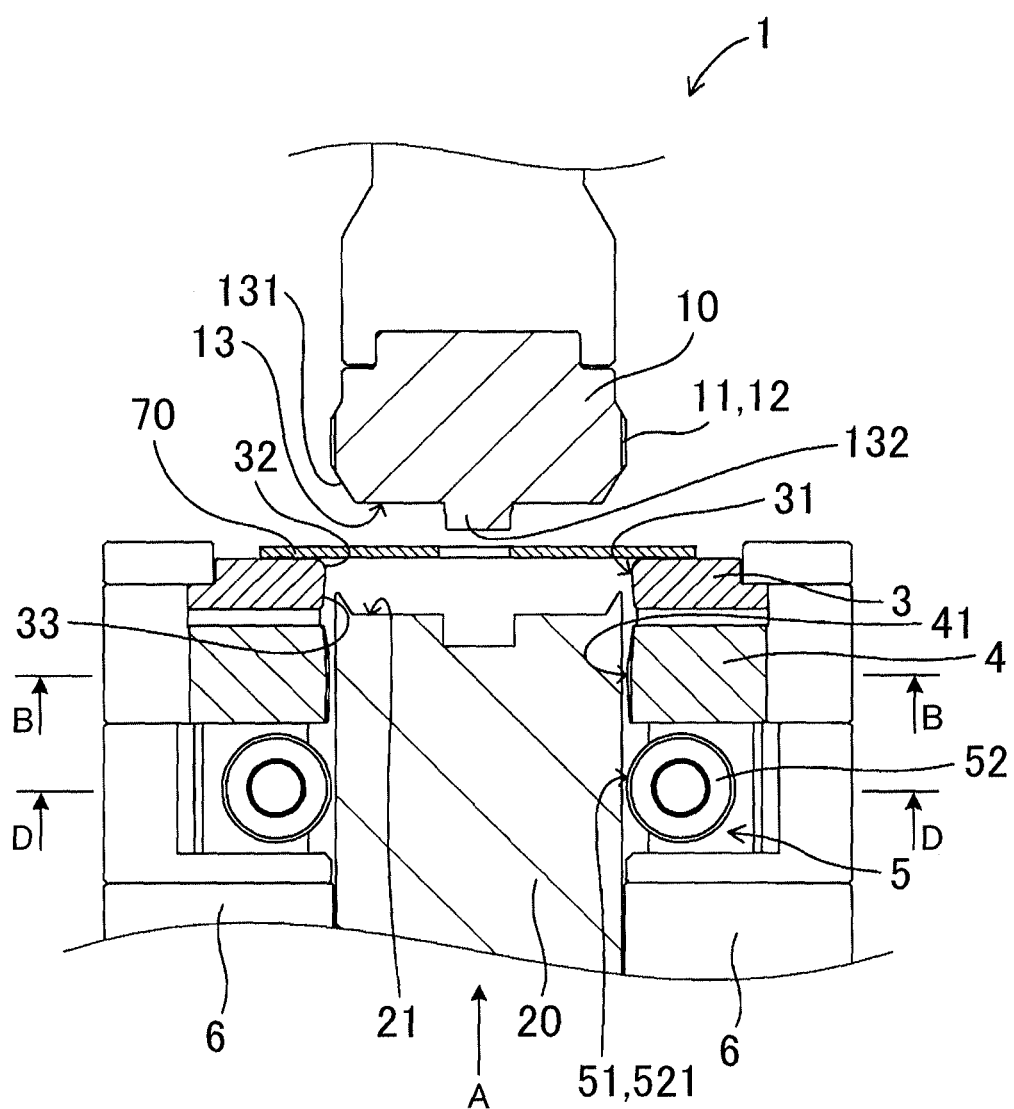
FIG. 1 is an explanatory view of a manufacturing apparatus for a cup-shaped member before forming in a first embodiment.

As illustrated in FIG. 1, the manufacturing apparatus 1 for the cup-shaped member 7 includes: the upper punch 10 having a generally column shape; the drawing die 3, the preliminary tooth forming die 4, and the forming roller portion 5 that form the cup-shaped member 7 together with the upper punch 10; and a one-stroke press machine (not shown) that causes the upper punch 10 to reciprocate in the axial direction.

Figure 6:
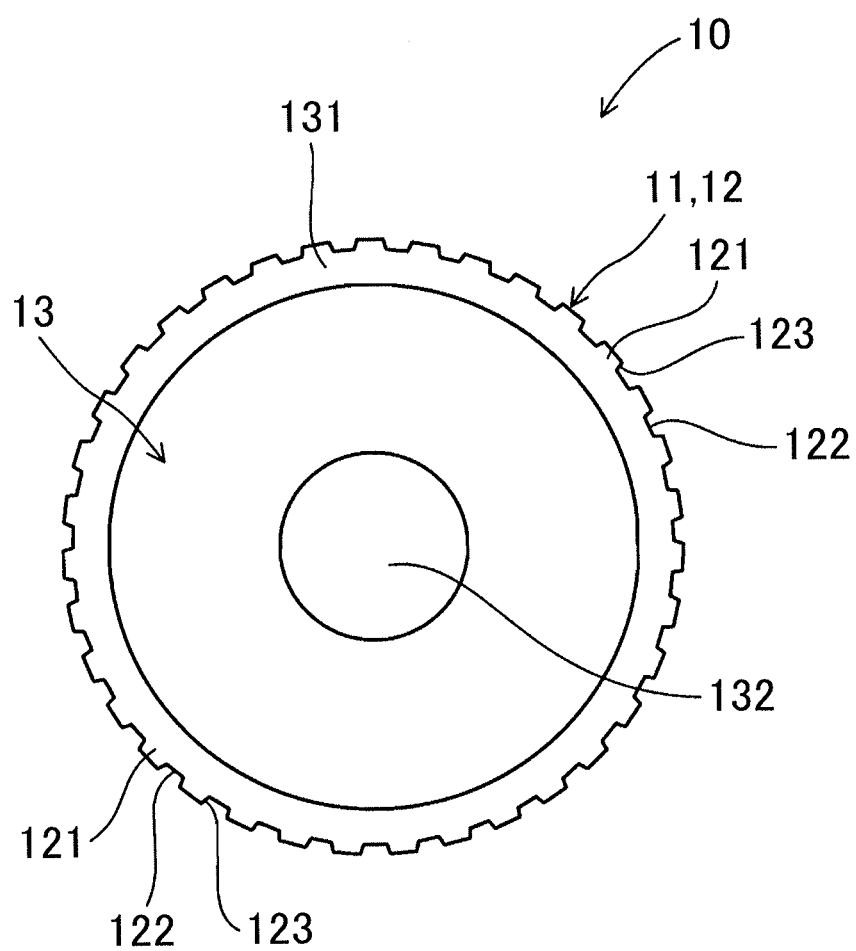
FIG. 6 is an explanatory view of a punch viewed from a direction of an arrow A in FIG. 1.

As illustrated in FIG. 1 and FIG. 6, the upper punch 10 has a generally column shape extending in the axial direction, and includes the inner tooth forming portion 12 corresponding to the inner peripheral shape of the corrugated portion 721 on the outer peripheral surface 11 of the upper punch 10.

The inner tooth forming portion 12 includes inner-tooth tooth portions 121 each having a shape corresponding to the inner peripheral surface of the corresponding large diameter portion 723 in the corrugated portion 721 of the cup-shaped member 7 and inner-tooth groove portions 122 each having a shape corresponding to the inner peripheral surface of the corresponding small diameter portion 722. A slope connecting the top surface of each of the inner-tooth tooth portions 121 and the bottom surface of the corresponding inner-tooth groove portion 122 is an inner-tooth slope portion 123 having a shape corresponding to the inner peripheral surface of the tooth surface portions 724 in the corrugated portion 721.

A punch distal end portion 13 at a lower end of the upper punch 10 is provided on the outer periphery thereof with a punch tapered portion 131 of which the diameter reduces toward the distal end of the upper punch 10.

The punch distal end portion 13 is provided with a protrusion 132 on a lower surface thereof. The protrusion 132 is inserted into the through hole 711 of the cup-shaped member 7 (material 70) during the forming of the cup-shaped member 7, so that the material 70 can be positioned in the radial direction.

A base end portion of the upper punch 10 is coupled to an upper driving source (not shown) of the one-stroke pressing machine, and thus is structured to be capable of reciprocating in the axial direction.

As shown in FIG. 1, a lower punch 20 is disposed below the upper punch 10. The lower punch 20 has a generally column shape extending in the axial direction, and includes a lower punch recess 21 having a shape corresponding to the punch distal end portion 13 on an upper surface of the lower punch 20.

A lower end portion of the lower punch 20 is coupled to a lower driving source (not shown) of the one-stroke pressing machine, and thus is structured to be capable of reciprocating in the up-down direction.

As illustrated in FIG. 1 to FIG. 5, the drawing die 3 has a generally annular shape, and the inner peripheral surface thereof forms the drawing hole 31 for forming the disk-shaped material 70 into a cup shape. The drawing hole 31 is provided with a fillet at an upper edge 32 on the upper end, and includes a drawing recess 33 having a tapered shape of which the diameter increases downward from the lower end of the fillet. The inner diameter of the drawing hole 31 is set by adding a predetermined clearance to the outer diameter of the large diameter portions 723 of the cup-shaped member 7. In this embodiment, the clearance is about 10% of the plate thickness.

As illustrated in FIG. 1, the preliminary tooth forming die 4 is provided below the drawing die 3.

As illustrated in FIG. 7, the preliminary tooth forming die 4 has a generally annular shape and the inner peripheral surface thereof forms the preliminary tooth forming hole 41 for the preliminary processing for the corrugated portion 721. The preliminary tooth forming hole 41 includes preliminary forming protrusions 411 for forming the preliminary small diameter portions 732 and the preliminary forming recesses 412 for forming the preliminary large diameter portions 731. Preliminary forming slope portions 413 for forming the preliminary tooth surface portions 733 are formed between each of the top surface of the preliminary forming protrusion 411 and the bottom surface of the corresponding preliminary forming recess 412 as a slope connecting the surfaces.

The position of the top surface of the preliminary forming protrusions 411 in the radial direction is closer to the large diameter portions 723 than the position of the small diameter portions 722 in the cup-shaped member 7. In this embodiment, as illustrated in FIG. 13, the distance between the preliminary forming protrusions 411 and the inner-tooth groove portions 122 of the upper punch 10 is set to be generally the same as the thickness of the material 70 before being formed. Thus, between the preliminary forming protrusions 411 and the inner-tooth groove portions 122 of the upper punch 10, ironing is not heavily performed and drawing for forming the preliminary small diameter portions 732 is mainly performed.

As illustrated in FIG. 13, the width W2 of the preliminary forming recesses 412 in the peripheral direction is larger than the width W1 of the large diameter portions 723 in the cup-shaped member 7. The position of the bottom surface of the preliminary forming recesses 412 in the radial direction is generally the same as the position of the large diameter portions 723 in the cup-shaped member 7. Thus, ironing for the large diameter portions 723 to have a final width is performed between the preliminary forming recesses 412 and the inner-tooth groove portions 122 of the upper punch 10. Accordingly, the preliminary large diameter portions 731 formed by the preliminary forming recesses 412 and the inner-tooth tooth portions 122 have generally the same thickness, inner diameter, and outer diameter as those of the large diameter portions 723, and has a larger width than that of the large diameter portions 723.

As described above, the width W2 of the preliminary forming recesses 412 in the peripheral direction is set to be large. Thus, the distance between the preliminary forming slope portions 413 and the inner-tooth slope portion 123 of the upper punch 10 is larger than the final thickness of the tooth surface portion 724. In this embodiment, the width W2 of the preliminary forming recesses 412 is set in such a manner that the distance between the preliminary forming slope portions 413 and the inner-tooth slope portion 123 is larger than the thickness of the material 70 before being formed. Thus, drawing to form the preliminary tooth surface portions 733 is performed between the preliminary forming slope portions 413 and the inner-tooth slope portion 123.

The position of the bottom surface of the preliminary forming recesses 412 in the radial direction is generally the same as the position of the large diameter portions 723 of the cup-shaped member 7. Thus, the preliminary large diameter portions 731 formed by the preliminary forming recesses 412 have generally the same thickness, inner diameter, and outer diameter as those of the large diameter portions 723 as described above. Thus, almost no ironing is required when the forming roller portion 5 forms the preliminary large diameter portions 731 into the large diameter portions 723. Accordingly, the large diameter portions 723 can be prevented from having a step on the top surface due to the clearance between the adjacent final forming surfaces 523 in the forming roller portion 5.

Figure 8:
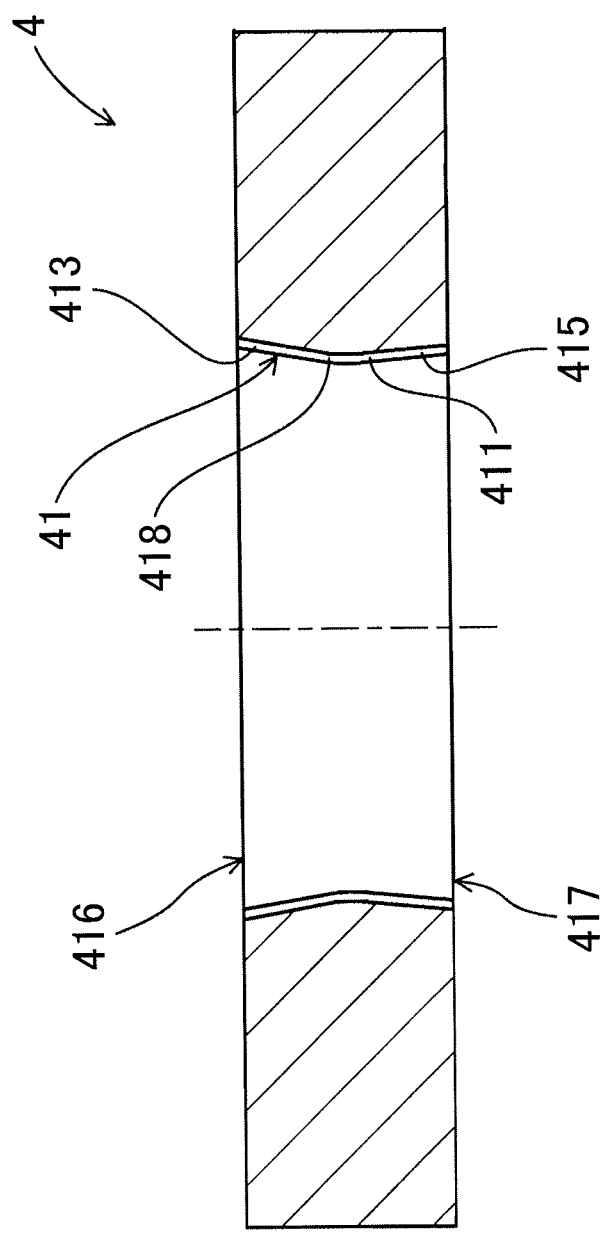
FIG. 8 is a cross-sectional view taken along lines indicated by arrows C-C in FIG. 7.

As illustrated in FIG. 8, the preliminary tooth forming hole 41 includes an entrance tapered portion 413 and an exit tapered portion 415. The entrance tapered portion 413 has the diameter reducing from an upper opening edge 416 on the upper side toward a reduced diameter portion 418 at a generally center position in the axial direction of the preliminary tooth forming hole 41. The exit tapered portion 415 has the diameter reducing from a lower opening edge 417 on the lower side toward the reduced diameter portion 418. The preliminary forming protrusions 411 and the preliminary forming recesses 412 are formed along the axial direction on a surface forming the entrance tapered portion 413 and the exit tapered portion 415.

As shown in FIG. 1, the forming roller portion 5 is provided below the preliminary tooth forming die 4.

Figure 9:
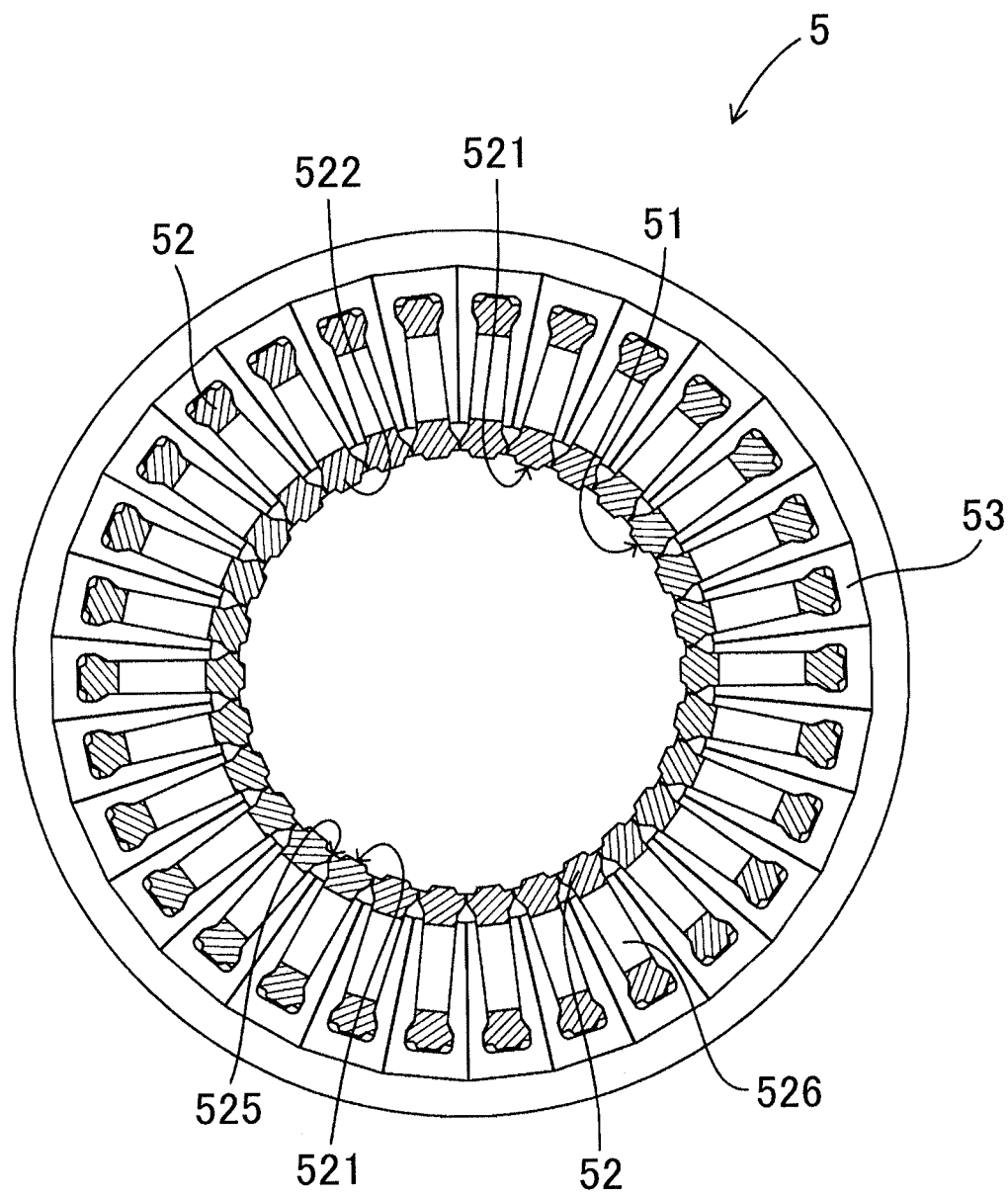
FIG. 9 is a cross-sectional view taken along lines indicated by arrows D-D in FIG. 1.
Figure 10:
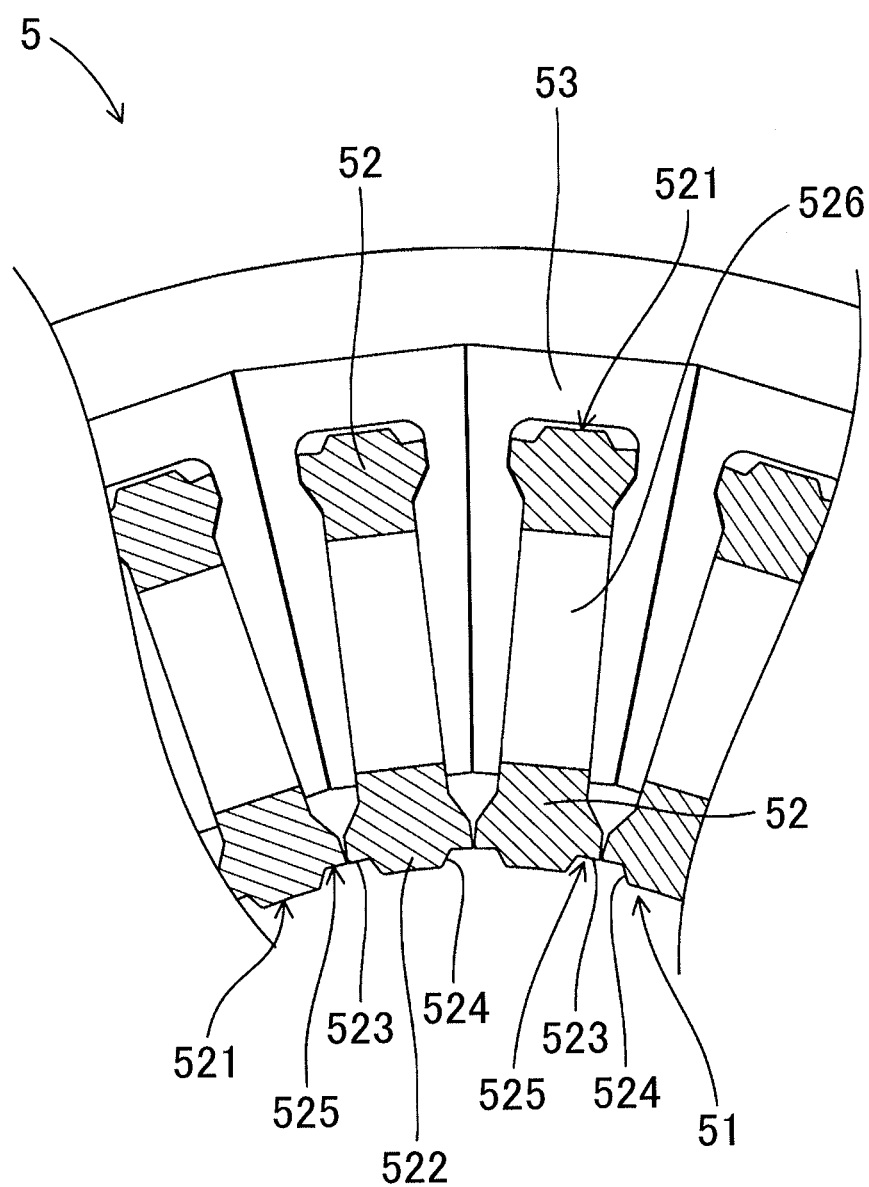
FIG. 10 is a partially enlarged view of FIG. 9.

As illustrated in FIG. 9 and FIG. 10, the forming roller portion 5 includes a plurality of radially arranged forming rollers 52.

The forming rollers 52 define a generally annular shape, and each include, on an outer peripheral surface 521, a final forming protrusion 522 corresponding to the outer peripheral shape of the small diameter portion 722 at a generally center position in the circumferential direction of the corresponding forming roller 52. The outer peripheral surface 521 includes final forming surfaces 523 corresponding to the large diameter portions 723 at adjacent positions on both sides in the circumferential direction of the final forming protrusion 522. Final forming slopes 524 formed between the top surfaces of the final forming protrusions 522 and the final forming surfaces 523 as slopes connecting the both. The forming roller 52 includes a bearing 526 on the inner peripheral surface.

The forming rollers 52 are radially arranged by cylindrical roller holders 53 and rotatably held with rotational shafts (not shown) inserted in the respective bearings 526. The final tooth forming hole 51 corresponding to the outer peripheral shape of the corrugated portion 721 is formed by the contiguously arranging outer peripheral surfaces 521 of the radially arranged forming rollers 52. The final forming recesses 525 corresponding to the shape of the large diameter portions 723 are each defined by the final forming surfaces 523 of the adjacent forming rollers 52.

As illustrated in FIG. 1 to FIG. 5, the drawing die 3, the preliminary tooth forming die 4, and the forming roller portion 5 are stacked on a press base portion 6 disposed on a floor surface in this order from the top. The drawing die 3, the preliminary tooth forming die 4, and the forming roller portion 5 are disposed in such a manner to have their center lines rectilinearly aligned.

The cup-shaped member 7 is manufactured with the thus structured manufacturing apparatus 1 for the cup-shaped member 7.

First, as illustrated in FIG. 1 and FIG. 11A, the material 70 formed into an annular shape by pressing is placed on the drawing die 3.

Figure 2:
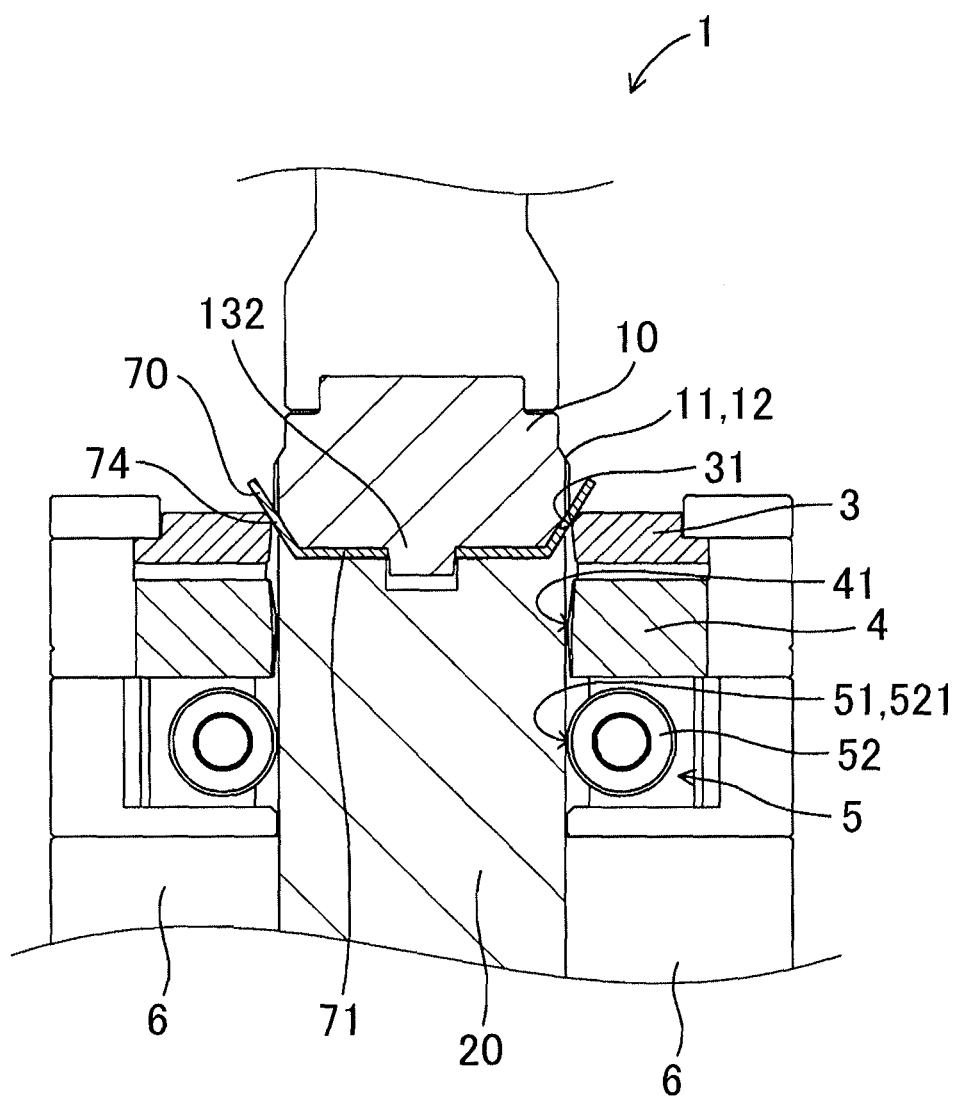
FIG. 2 is an explanatory view of the manufacturing apparatus for a cup-shaped member in a state where a material is being sandwiched in the first embodiment.

Then, as illustrated in FIG. 2, the upper punch 10 is moved downward by the upper driving source. Thus, the protrusion 132 of the upper punch 10 is inserted in the through hole 711 of the material 70, so that the material 70 is positioned in the radial direction. Then, the upper punch 10 moving downward and the drawing die 3 deform the material 70 into a cup shape.

As illustrated in FIG. 2, as the upper punch 10 further moves downward, the material 70 is sandwiched by the upper punch 10 and the lower punch 20. Here, as illustrated in FIG. 11B, the material 70 deforms along the punch distal end portion 13 and the lower punch recess 21 on the upper surface of the lower punch 20, so that the bottom portion 71 and a slope 74 inclined upward from the bottom portion 71 are formed.

Then, the manufacturing proceeds to the drawing step.

Figure 3:
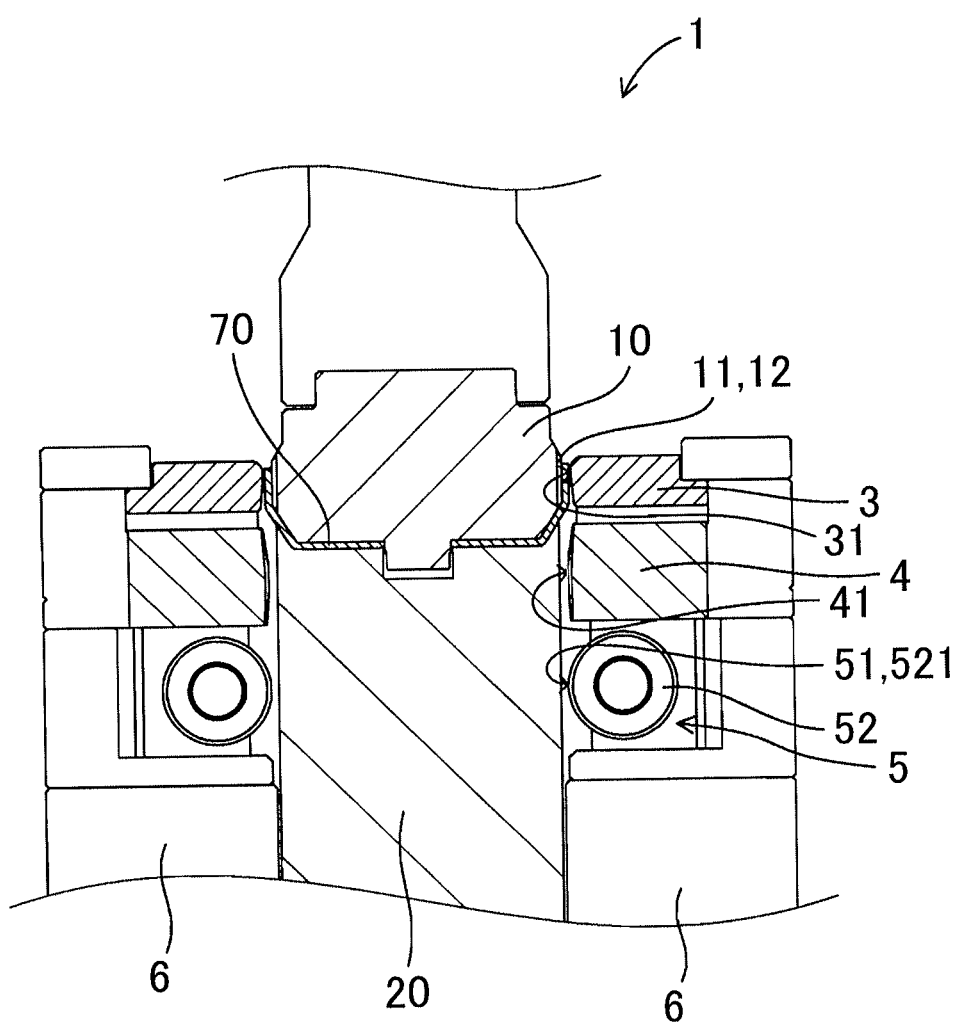
FIG. 3 is an explanatory view of the manufacturing apparatus for a cup-shaped member after a drawing step in the first embodiment.

As illustrated in FIG. 3, the drawing step is performed as the material 70 moves downward while being sandwiched by the upper punch 10 and the lower punch 20 to pass through the drawing hole 31 of the drawing die 3. Thus, as illustrated in FIG. 11C, the cylinder portion 72 is formed that stands upward in an outer peripheral portion of the slope 74 of the material 70. In addition, the inner peripheral portion of the slope 74 sandwiched by the upper punch 10 and the lower punch 20 serves as a cup tapered portion 725.

Then, the manufacturing proceeds to a preliminary processing step.

Figure 4:
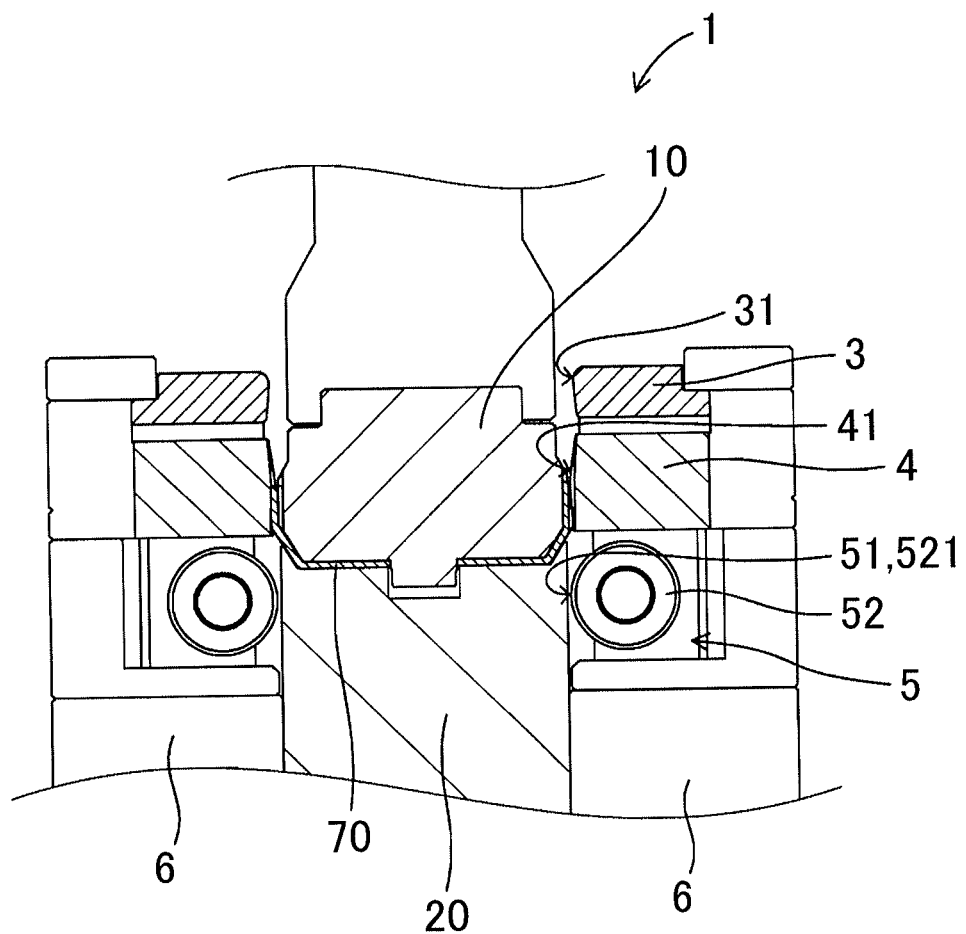
FIG. 4 is an explanatory view of the manufacturing apparatus for a cup-shaped member after a preliminary processing step in the first embodiment.
Figure 12A:
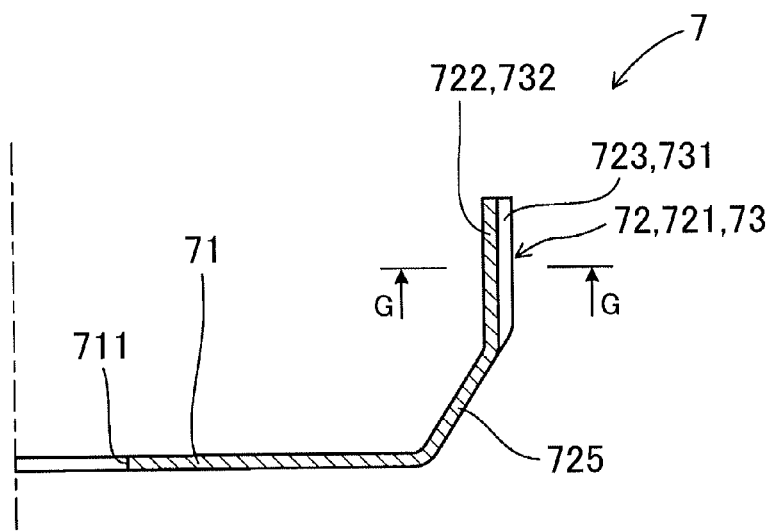
FIG. 12A is a partial sectional view of the cup-shaped member after the preliminary processing step (a sectional view taken along lines indicated by arrows E-E in FIG. 15)
Figure 12B:
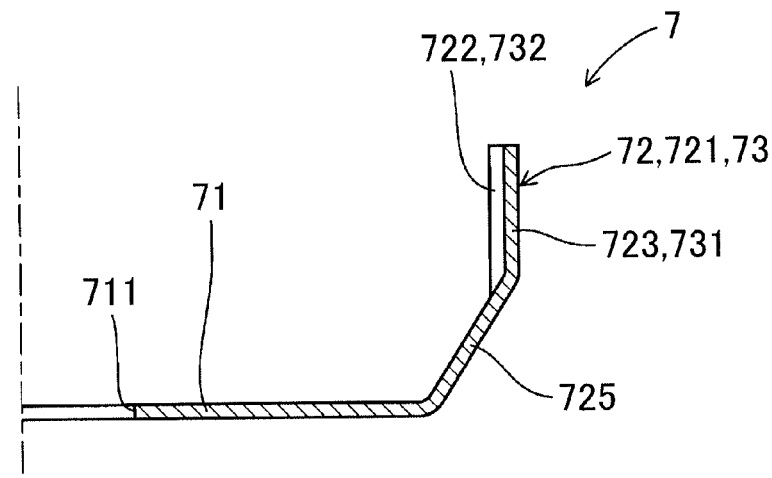
FIG. 12B is a partial sectional view of the cup-shaped member after the preliminary processing step (a sectional view taken along lines indicated by arrows F-F in FIG. 15) in the first embodiment.

As illustrated in FIG. 4, the processing is performed as the material 70 is moved downward while being sandwiched by the upper punch 10 and the lower punch 20 to pass through the preliminary tooth forming hole 41 of the preliminary tooth forming die 4. Thus, the preliminary corrugated portion 73 is provided on the cylinder portion 72 of the material 70 as illustrated in FIG. 12A and FIG. 12B.

As illustrated in FIG. 13, ironing for forming the preliminary large diameter portions 731 and drawing for forming the preliminary small diameter potions 732 and the preliminary tooth surface portions 733 are performed between the upper punch 10 and the preliminary tooth forming die 4. Here, the width W2 of the preliminary forming recesses 412 is set in such a manner that the distance between the preliminary forming slope portions 413 of the preliminary tooth forming die 4 and the inner-tooth slope portion 123 of the upper punch 10 is larger than the thickness of the material 70 before being formed. Thus, a space larger in volume than the preliminary tooth surface portion 733 is formed between the preliminary forming slope portions 413 and the inner-tooth slope portion 123. Accordingly, spaces S1 and S2 not filled with the material 70 are formed. With these spaces for receiving pads produced during ironing formed at positions adjacent to the preliminary large diameter portions 731, the pads can be readily moved, and the ironing resistance can be reduced.

When the preliminary small diameter portion 732 is formed, portions of the material 70 corresponding to the preliminary tooth surface portions 733 are deformed while being stretched radially inward. This causes force to facilitate the movement of pads produced during ironing on the preliminary large diameter portions 731 toward the preliminary tooth surface portion 733, so that the pads can be readily moved.

Then, the manufacturing proceeds to a finishing step.

Figure 5:
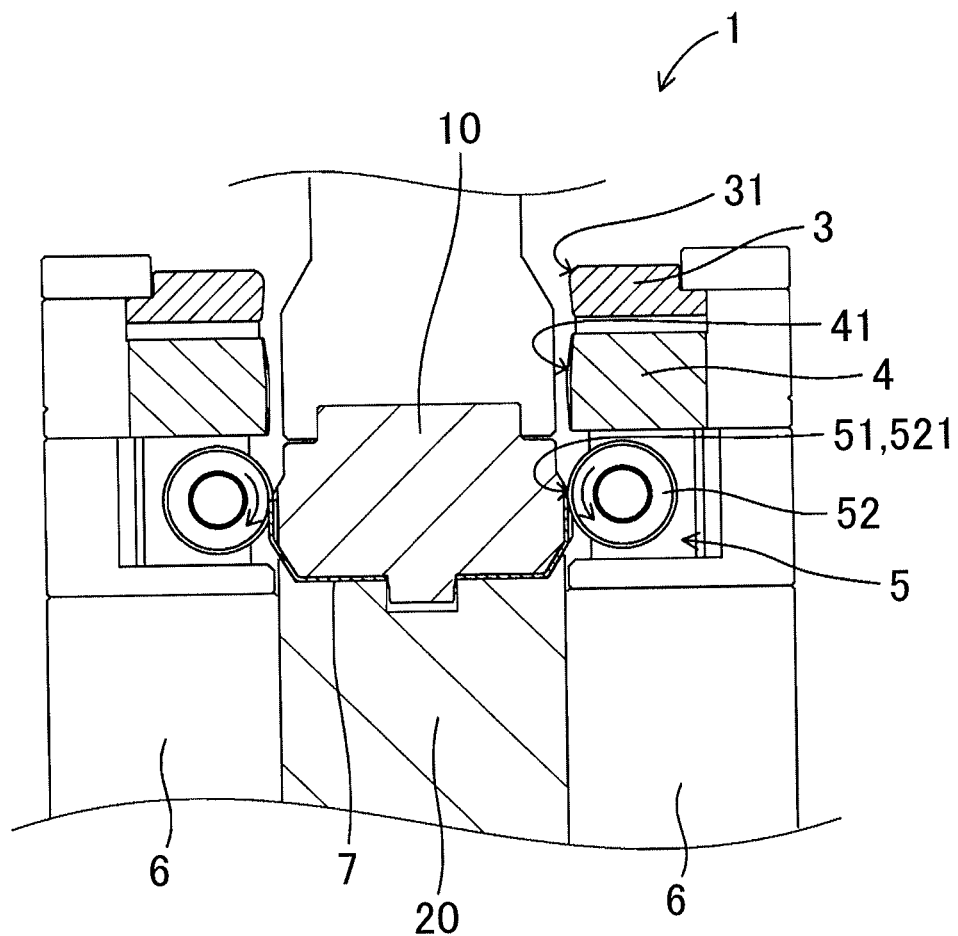
FIG. 5 is an explanatory view of the manufacturing apparatus for a cup-shaped member after a finishing step in the first embodiment.
Figure 14:
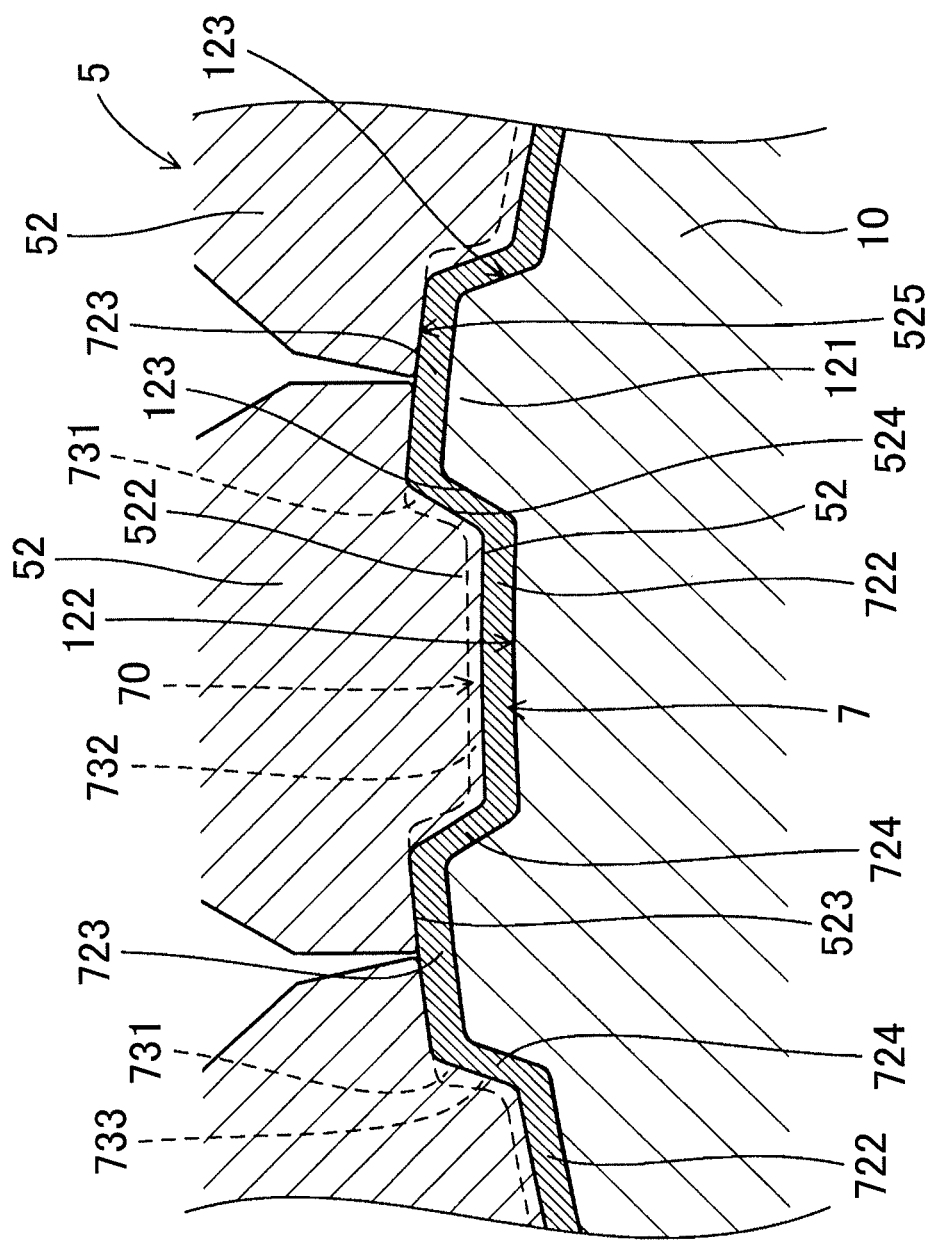
FIG. 14 is a partial cross-sectional view of the cup-shaped member after the finishing step (a cross-sectional view taken along lines indicated by arrows G-G in FIG. 12A) in the first embodiment.

As illustrated in FIG. 5, ironing to form the preliminary corrugated portion 73 into the corrugated portion 721 is performed as the material 70 is moved downward while being sandwiched by the upper punch 10 and the lower punch 20 to pass through the forming roller portion 5. As illustrated in FIG. 14, in the finishing step, the forming rollers 52 of the forming roller portion 5 rotate to perform ironing on the preliminary small diameter portions 732 and the preliminary tooth surface portions 733 to form the preliminary corrugated portion 73 into the corrugated portion 721. The thickness of the preliminary tooth surface portions 733 formed in the preliminary processing step is larger than the thickness of the tooth surface portions 724 due to the pads flowing in the preliminary tooth surface portions 733 as described above.

Thus, in the finishing step, ironing can be performed by expanding the preliminary tooth surface portion 733 with the forming roller 52. Accordingly, the pads can be distributed throughout the large diameter potions 723 and the small diameter portions 722 and can be surely filled. Thus, the large diameter portions 723, the small diameter portions 722, and the tooth surface portions 724 can be accurately and surely formed.

The preliminary large diameter portions 731 are formed to have the same thickness, inner diameter, and outer diameter as those of the large diameter portions 723. Thus, almost no ironing is required when the forming roller portion 5 forms the preliminary large diameter portions 731 into the large diameter portions 723. Accordingly, the large diameter portions 723 can be prevented from having a step on the top surface due to the clearance formed between the adjacent final forming surfaces 523 of the forming roller portion 5.

Thus, the manufacturing of the cup-shaped member 7 including the corrugated portion 721 is completed.

As described above, the manufacturing method for the cup-shaped member 7 including the corrugated portion 721 of this embodiment includes the drawing step, the preliminary processing step, and the finishing step. In the preliminary processing step, the preliminary large diameter portions 731 of the preliminary corrugated portion 73 are formed to at least have a larger width than the size of the large diameter portions 723 of the corrugated portion 721. Thus, the ironing resistance in the preliminary processing step and the finishing step can be reduced and the ironing resistance can be distributed in these steps. Thus, a cup-shaped member 7 can be manufactured with high accuracy and low cost without lubricating the material 70 beforehand.

The manufacturing apparatus 1 for the cup-shaped member 7 includes the upper punch 10, the drawing die 3, the preliminary tooth forming die 4, and the forming roller portion 5. Thus, with the manufacturing apparatus 1 for the cup-shaped member 7, an excellent manufacturing method can be surely achieved, and the cup-shaped member 7 can be readily manufactured.

The preliminary tooth forming die 4 having a simple structure and the forming roller portion 5 with a small amount of relative slip with respect to the material 70 are used in combination. Thus, the size of the manufacturing apparatus 1 for the cup-shaped member 7 can be reduced with the formability and the forming accuracy for the cup-shaped member 7 secured.

The upper punch 10 is structured to sequentially pass through the drawing hole 31 of the drawing die 3, the preliminary tooth forming hole 41 of the preliminary tooth forming die 4, and the final tooth forming hole 51 of the forming roller portion 5. Accordingly, the drawing die 3, the preliminary tooth forming die 4, and the forming roller portion 5 are rectilinearly arranged and thus, the processing with the drawing die 3, the preliminary tooth forming die 4, and the forming roller portion 5 can be performed in a single stroke of the upper punch 10. Thus, the productivity of the cup-shaped member 7 can be improved.

In the preliminary tooth forming hole 41 of the preliminary tooth forming die 4, the preliminary forming protrusions 411 is positioned radially outward of the small diameter portion 722. In this embodiment, the thickness of the preliminary small diameter portion 732 is set to be generally the same as the thickness of the material 70. Thus, ironing on the preliminary small diameter portions 732 is generally omitted in the preliminary processing step, and the entire ironing for the small diameter portions 722 is carried out in the finishing step. This further reduces the ironing resistance in the preliminary processing step, and optimizes the resistance balance between the preliminary processing step and the finishing step.

As described in this embodiment, the manufacturing method and the manufacturing apparatus for a cup-shaped member as described above can achieve reduction in the size of facilities and manufacture cup-shaped members with high accuracy and low cost.

What is claimed is:

1. A manufacturing method for a cup-shaped member having a corrugated portion, which includes a disk-shaped bottom portion and a cylinder portion standing upright with respect to the bottom portion, and in which the corrugated portion having small diameter portions formed by denting the cylinder portion radially inward, large diameter portions protruding radially outward of the small diameter portions, and tooth surface portions connecting the small diameter portions with the large diameter portions is formed, the manufacturing method comprising:

a drawing step of forming a disk-shaped material into a cup shape;

a preliminary processing step of performing ironing with a generally column-shaped punch including an inner tooth forming portion corresponding to an inner peripheral shape of the corrugated portion on an outer peripheral surface and a preliminary tooth forming die having a preliminary tooth forming hole to form a preliminary corrugated portion including preliminary small diameter portions, preliminary large diameter portions, and preliminary tooth surface portions; and a finishing step of performing ironing with the punch and a forming roller portion in which a final tooth forming hole corresponding to an outer peripheral shape of the corrugated portion is formed by contiguously arranging outer peripheral surfaces of a plurality of radially arranged forming rollers to form the preliminary corrugated portion into the corrugated portion, wherein a distance between preliminary forming slope portions provided in the preliminary tooth forming hole and inner-tooth slope portions provided in the inner tooth forming portion is larger than the thickness of the material before being formed, and a distance between preliminary forming recesses provided in the preliminary tooth forming hole and inner-tooth tooth portions provided in the inner tooth forming portion is set to be generally the same as a distance between final forming surfaces provided in the forming roller portion and the inner-tooth tooth portions.

2. The manufacturing method for the cup-shaped member including a corrugated portion according to claim 1, wherein,
   in the preliminary tooth forming hole of the preliminary tooth forming die, preliminary forming protrusions for forming the preliminary small diameter portions are positioned radially outward of the small diameter portions to be formed.

3. A manufacturing apparatus for a cup-shaped member having a corrugated portion, which includes a disk-shaped bottom portion and a cylinder portion standing upright with respect to the bottom portion, and in which a corrugated portion having small diameter portions formed by denting the cylinder portion radially inward, large diameter portions protruding radially outward of the small diameter portions, and tooth surface portions connecting the small diameter portions with the large diameter portions is formed, the manufacturing apparatus comprising:

a generally column-shaped punch including an inner tooth forming portion corresponding to an inner peripheral shape of the corrugated portion on an outer peripheral surface;

a drawing die having a drawing hole for forming a disk-shaped material into a cup shape;

a preliminary tooth forming die having a preliminary tooth forming hole corresponding to an outer peripheral shape of a preliminary corrugated portion including preliminary small diameter portions, preliminary large diameter portions, and preliminary tooth surface portions; and a forming roller portion in which a final tooth forming hole corresponding to an outer peripheral shape of the corrugated portion is formed by contiguously arranging outer peripheral surfaces of a plurality of radially arranged forming rollers, wherein the punch is structured to sequentially pass through the drawing hole of the drawing die, the preliminary tooth forming hole of the preliminary tooth forming die, and the final tooth forming hole of the forming roller portion, and a distance between preliminary forming slope portions provided in the preliminary tooth forming hole and inner-tooth slope portions provided in the inner tooth forming portion is larger than thickness of the material before being formed and a distance between preliminary forming recesses provided in the preliminary tooth forming hole and inner-tooth tooth portions provided in the inner tooth forming portion is set to be generally the same as a distance between final forming surfaces provided in the forming roller portion and the inner-tooth tooth portions.

4. The manufacturing apparatus for the cup-shaped member including the corrugated portion according to claim 3, wherein, in the preliminary tooth forming hole of the preliminary tooth forming die, preliminary forming protrusions for forming the preliminary small diameter portions are positioned radially outward of the small diameter portions to be formed.

* * * * *